(12) United States Patent
Anderson et al.

(10) Patent No.: US 11,125,945 B2
(45) Date of Patent: Sep. 21, 2021

(54) OPTICAL FIBER THERMAL PROPERTY PROBE

(71) Applicant: Wisconsin Alumni Research Foundation, Madison, WI (US)

(72) Inventors: Mark Harlan Anderson, Oregon, WI (US); Matthew Thomas Weathered, Naperville, IL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/671,291

(22) Filed: Aug. 8, 2017

(65) Prior Publication Data

US 2018/0059325 A1 Mar. 1, 2018

Related U.S. Application Data

(60) Provisional application No. 62/381,324, filed on Aug. 30, 2016.

(51) Int. Cl.

| | |
|---|---|
| *G02B 6/00* | (2006.01) |
| *G02B 6/26* | (2006.01) |
| *G02B 6/42* | (2006.01) |
| *G02B 6/287* | (2006.01) |
| *B29C 65/16* | (2006.01) |
| *G02B 6/02* | (2006.01) |
| *C03B 37/15* | (2006.01) |
| *G02B 6/27* | (2006.01) |
| *C03B 37/025* | (2006.01) |
| *G01K 11/32* | (2021.01) |

(52) U.S. Cl.
CPC .............. *G02B 6/287* (2013.01); *B29C 65/16* (2013.01); *C03B 37/0253* (2013.01); *C03B 37/15* (2013.01); *G01K 11/32* (2013.01); *G02B 6/02395* (2013.01); *G02B 6/272* (2013.01)

(58) Field of Classification Search
CPC .......... G02B 6/262; G02B 2006/12138; G02B 6/4459; G02B 6/02204; G01V 8/16; G01V 8/24; G01V 8/10; B29C 71/02
USPC ....................................... 385/12, 13, 28, 137
See application file for complete search history.

(56) References Cited

U.S. PATENT DOCUMENTS

| | | | |
|---|---|---|---|
| 5,730,026 A | 3/1998 | Maatuk | |
| 9,074,921 B1* | 7/2015 | Parker, Jr. | ............... G01F 23/22 |
| 2003/0108268 A1* | 6/2003 | Hashimoto | ........ G02B 6/29322 |
| | | | 385/12 |
| 2005/0269077 A1* | 12/2005 | Sandberg | ................ E21B 36/04 |
| | | | 166/249 |

(Continued)

OTHER PUBLICATIONS

LUNA Engineering Note; EN-FY1318; "Measuring Liquid Level Using Fiber Optic Sensing"; pp. 1-6; Aug. 8, 2013; VA.

(Continued)

*Primary Examiner* — Thomas A Hollweg
*Assistant Examiner* — Hung Q Lam
(74) *Attorney, Agent, or Firm* — Boyle Fredrickson, S.C.

(57) ABSTRACT

An optical fiber sensor extends coaxially with a controllable heater to provide high-resolution axial measurement of thermal properties such as thermal convection of the surrounding. Heat removal by either conduction or convection may be used to deduce material height in a tank, or velocity of flow when coupled with localized heating, or other aspects of the material based on thermal conductivity.

17 Claims, 4 Drawing Sheets

(56) References Cited

U.S. PATENT DOCUMENTS

| | | | | |
|---|---|---|---|---|
| 2012/0179390 A1* | 7/2012 | Kimmiau | ............ | E21B 47/0001 |
| | | | | 702/35 |
| 2013/0021615 A1* | 1/2013 | Duncan | .................. | G01H 9/004 |
| | | | | 356/477 |
| 2013/0206748 A1* | 8/2013 | Vinegar | .................. | E21B 43/24 |
| | | | | 219/542 |
| 2014/0321798 A1* | 10/2014 | Chen | ...................... | G01N 21/05 |
| | | | | 385/12 |
| 2016/0349403 A1* | 12/2016 | Farhadiroushan | ... | G01V 11/005 |

OTHER PUBLICATIONS

Gerardi et al. "Distributed temperature sensor testing in liquid sodium." Nuclear Engineering and Design 312 (2017): pp. 59-65. US

* cited by examiner

OPTICAL FIBER THERMAL PROPERTY PROBE

CROSS REFERENCE TO RELATED APPLICATION

This application claims the benefit of U.S. provisional application Ser. No. 62/381,324 filed Aug. 30, 2016 and hereby incorporated by reference.

BACKGROUND OF THE INVENTION

The present invention relates to an optical fiber probe, and in particular, to an optical fiber probe that can sense thermal properties of the surrounding medium.

Next generation (generation IV) nuclear reactors such as the Sodium Fast Reactor (SFR) employ alkali liquid metal (e.g., sodium) as a coolant carrying heat from the reactor core. Critical for the construction of such reactors is an ability to provide instrumentation that can measure level, temperature, and velocity distributions in a material such as liquid sodium or fuel at temperatures above 371 Kelvin.

Normal instrumentation, for example, for level sensing, including ultrasonic and mechanical approaches, can be prone to failure in such extreme operating environments,

SUMMARY OF THE INVENTION

The present invention provides an optical fiber linked with a heater allowing it to characterize thermal properties of nearby materials at multiple points along the fiber at extremely high temperatures associated with nuclear reactors or heat storage systems. Measurements by the system may determine material levels (such as the level of liquid sodium or similar transfer or storage material) by detecting changes between the thermal properties of the material and an overlying gas column, or measure rates of flow when coupled with localized heating, or characterize nuclear fuel during use or the like.

Specifically, the invention provides a sensor system for characterizing material thermal properties and includes an optical fiber, a heater strip coextending with the optical fiber, an optical assembly for transmitting light into the optical fiber and detecting light received from the optical fiber, and an electronic circuit communicating with the optical assembly and the heater strip to: (a) characterize temperature at multiple points along a length of the optical fiber from the light received from the optical fiber as influenced by the heat output from the heater strip; and (b) determine and output a measure related to thermal property of a medium surrounding the optical fiber and heater strip.

It is thus a feature of at least one embodiment of the invention to provide sophisticated multipoint analysis of thermal conductivity of materials such as can be used for a variety of sensing purposes.

The sensor system may include a thermally conductive shield around the optical fiber.

It is thus a feature of at least one embodiment of the invention to permit use of the sensor system in hostile environments such as in liquid sodium, molten salts, or other organic and inorganic substances.

The conductive shield may be a stainless-steel tube filled with a fluid conductive medium positioned between an inner wall of the stainless-steel tube and the optical fiber.

It is thus a feature of at least one embodiment of the invention to provide robust shielding of the optical fiber that prevents thermal stresses caused by engagement between the fiber and the tube while promoting high thermal conductivity.

The conductive medium may be a moisture-free gas such as helium and the conductive shield may be hermetically sealed.

It is thus a feature of at least one embodiment of the invention to provide a shielding system that can accommodate extreme temperature variations without damage to the optical fiber.

The sensor system may provide a sheath surrounding the optical fiber and the heater strip including a conductive potting material holding the heater strip and optical fiber in thermal proximity.

It is thus a feature of at least one embodiment of the invention to provide a robust assembly that can produce consistent measurement results by close thermal linking between the heater and the optical fiber.

The heater strip may be a resistive wire element providing substantially uniform distributed heating along the length of the heater strip.

It is thus a feature of at least one embodiment of the invention to provide a uniform and constant heating to simplify the determination of thermal properties such as thermal conductivity or thermal convection.

These particular objects and advantages may apply to only some embodiments falling within the claims and thus do not define the scope of the invention.

DETAILED DESCRIPTION OF THE PREFERRED EMBODIMENT

Figures 1, 2:
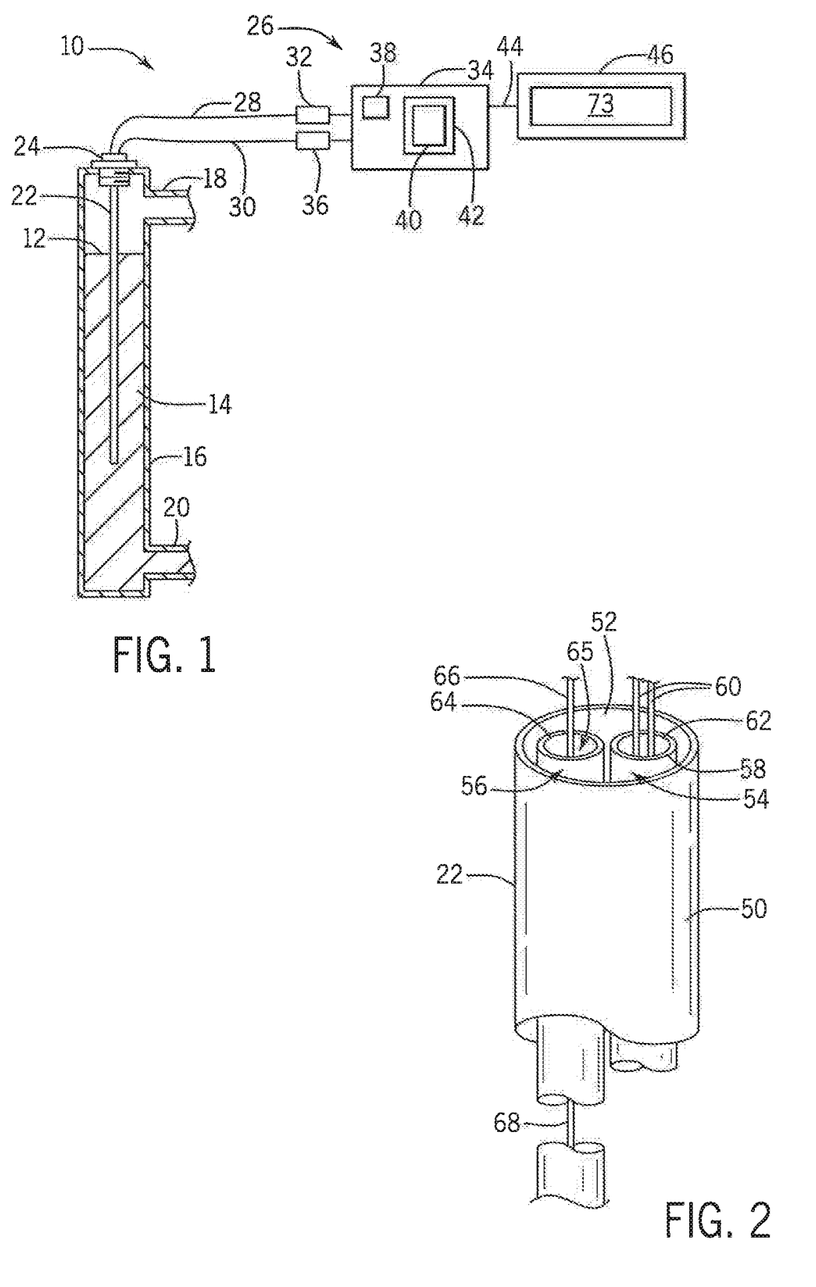
FIG. 1 is a cross-sectional view of a level sensor for liquid heat storage material employing the present invention providing a vertically extending probe passing through a surface of the liquid heat storage material and communicating with a reflectometer system.
FIG. 2 is a fragmentary perspective view of the probe of FIG. 1 showing parallel extending optical fiber and heater elements within a probe sheath.

Referring now to FIG. 1, a sensor system 10 of the present invention may be used, for example, to determine a height of a surface level 12 of a heat storage material 14 such as liquid sodium or other liquid metals or salts such as but not limited to NaNO$_3$KNO$_3$ salts and FLIBE salts (lithium fluoride and beryllium fluoride) up to 600 C. This heat storage material 14 may be held within an accumulator 16, for example, the accumulator 16 providing a vertically extending enclosed container communicating through inlet 18 and outlet 20 at the upper and lower ends of the accumulator 16 with elements of a nuclear reactor or the like. The sensor system 10 includes a vertically extending probe 22, for example, attached to penetrate an upper wall of the accumulator 16 through a sealing fitting 24 and pass downward through the surface level 12 into the heat storage material 14 within the accumulator 16.

A proximal end of the probe 22 outside of the accumulator 16 may connect to a reflectometer system 26 through optical conductor 28 (such as an optical fiber). Optical conductor 28 may be received by an optical assembly 32 (as will be described below) communicating in turn with an electronic computer 34. The proximal end of the probe 22 may also receive electrical signals communicated through electrical conductor 30 with a controllable power source 36 controlled by the computer 34.

Computer 34 may include one or more processors 38 executing a program 40, as will be discussed below, held in standard computer memory 42. The computer 34 may provide an output 44, for example, communicating with a display 46 which may display a number indicating a height of the liquid heat storage material 14 in the accumulator 16 or, as will be discussed in a further embodiment below, a velocity of movement of the fluid 14 or other thermal characteristics of material in contact with the probe 22 Alternatively, it will be appreciated that the display may indicate other thermal properties such as convection, thermal conductivity or the like and may be in a variety of different units or unitless.

A reflectometer system 26 providing the optical assembly 32 and optionally portions of the electronic computer 34 and suitable for use with the present invention is commercially available from Luna of Roanoke, Va., USA, under the tradename of Luna ODiSI-B Optical Distributed Sensor Interrogator.

Referring now also to FIG. 2, the probe 22 may provide for a generally linearly extending outer sheath 50, for example, in the form of a stainless-steel tube. Positioned within the outer sheath 50 and extending therealong may be an elongate heater element 54 and an optical fiber assembly 56, each generally adjacent to and parallel to the other and axially aligned within the sheath 50 to extend along a length of the sheath by a distance sufficient to pass above and below the surface level 12 over an expected range of heights of surface level 12. The elongate heater element 54 and optical fiber assembly 56 may be fixed within the outer sheath 50 in a thermally conductive potting material 52.

The heater element 54, for example, may provide for an outer tubular sheath 58 of thermally conductive material (for example, metal) holding a resistive heating element 60 (for example, a high resistance electrical conductor such as nichrome) extending downward along the length of the probe 22 and looping backward to provide a complete electrical circuit. The resistive heating element 60 provides ohmic heating uniformly along its length and along the length of the optical fiber assembly 56 although predictable variability in ohmic heating along the length of the resistive heating element 60 can be accommodated. The resistive heating element 60 may connect via electrical conductor 30 to receive a constant current electrical flow from the controllable power source 36. A space between the resistive heating element 60 and the tubular sheath 58 may be filled with an electrically insulating but thermally conductive potting material 62 for example a hardening ceramic powder or other material that can tolerate the necessary heat range. In alternative embodiments, the heating element 60 may extend downward through the probe 22 and the return electrical path may be provided through the sheath 50 or by separate conductor.

The optical fiber assembly 56 may provide for thermally conductive outer sheath 64, for example, a stainless-steel or ceramic tube hermetically sealed at its lower and upper ends to retain within the sheath 64 atmosphere of moisture-free helium 65 or other highly thermally conductive gas. Ideally, the material within the sheath 64 will have a thermal conductivity equal or exceeding that of helium.

Positioned within the helium 65 is single mode optical fiber 66 having a center core and outer cladding of different refractive indexes to promote internal reflection. Significantly, the optical fiber 66 may be entirely glass material without a polymer or other coating normally used in such fibers such as could interfere with measurements at high temperatures, for example, by presenting a substantially different coefficient of expansion. In an alternative embodiment, a graphite coated fiber may be employed and polymer materials may be used for low temperature applications.

A lower end of the optical fiber 66 may be spliced to a dispersive fiber element 68, for example, having only core material and no outer cladding to promote light leakage therefrom and thereby to eliminate high amplitude reflections from the end of the optical fiber 66. Alternatively, the dispersive fiber elements 68 may be implemented using a portion of the optical fiber 66 curled into a tight radius to promote such light leakage.

As noted, the thermally conductive outer sheath 64 is hermetically sealed to prevent loss or contamination of the moisture-free helium 65 and to shield the optical fiber 66 from moisture. The optical fiber 66 is generally mounted, for example, only at the top end of the thermally conductive outer sheath 64 so as to prevent the introduction of stress in the fiber as the optical fiber 66 and thermally conductive outer sheath 64 expand and contract at different rates over the range of operating temperatures. In this way, the surrounding moisture-free helium 65 allows the necessary slippage between the optical fiber 66 and the sheath 64 in contrast, for example, to a rigid potting material It will be appreciated that other materials than moisture-free helium 65 or other highly thermally conductive gases may be used such as provide freedom of movement of the optical fiber 66 and high thermal conductivity, including metals that retain a liquid state at room temperature.

Figure 9:
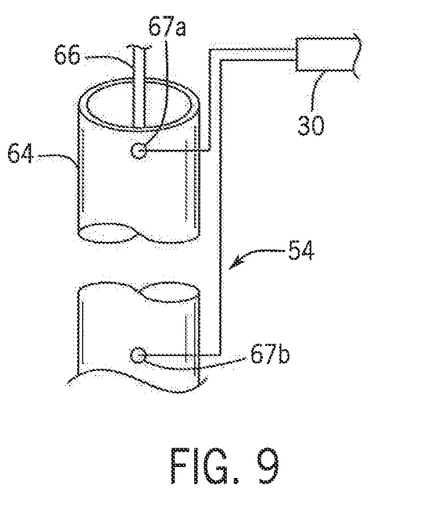
FIG. 9 is a fragmentary view of an alternative embodiment of the probe in which the fiber optic shield provides the heater element.

Referring now to FIG. 9, in an alternative embodiment, the heater element 54 may make use of the thermally conductive outer sheath 64 to provide an extremely low diameter probe 22 and one which reduces the thermal mass of the probe and improves coupling of the heater to the surrounding medium providing faster response. As depicted, the thermally conductive outer sheath 64 may be, for example, stainless steel having an electrical contact point 67a at its proximal end and an electrical contact point 67b at its distal end communicating with the electrical conductors 30 allowing a current to be passed along the length of the thermally conductive outer sheath 64 to produce ohmic heating. A similar approach may be used with a ceramic tube used for the thermally conductive outer sheath 64, for example, by applying a conductive material such as a PTC coating to the thermally conductive outer sheath 64. In that case, two parallel separate conductors may be used to allow a return path along the thermally conductive outer sheath 64.

Figure 3:
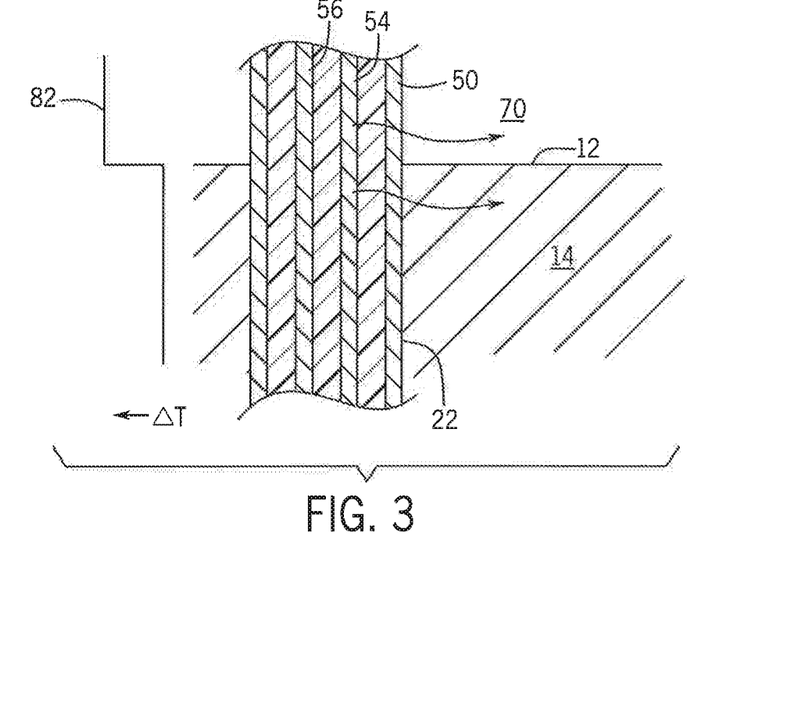
FIG. 3 is a fragmentary cross-section of the probe of FIG. 2 showing the use of the heater element to reveal thermal conductivity of the environment of the probe.

Referring now to FIG. 3, the optical fiber assembly 56 may provide a measure of temperatures at multiple points along the optical fiber assembly 56 using reflectometer techniques as will be discussed below. When these temperature measurements are combined with an activation and deactivation of the heater element 54, thermal properties of the environment of the probe 22 may be determined. For example, by comparing a change in temperature at a given location along the optical fiber assembly 56 between times of activation and deactivation of the heater element 54, thermal conductivity of the surrounding material can be deduced. "Thermal properties" include actual thermal resistance and apparent thermal resistance (for example, influenced by convective flow, velocity, or the like). Thermal properties may be used to deduce material characteristics, interfaces between different states of material or different material types, flow velocity, convection, and the like.

Consider, for example, the environment of liquid heat storage material 14 below the surface level 12 and heated air 70 above the surface level 12, When the heater element 54 is not activated, the temperatures measured by the optical fiber assembly 56 above and below the surface level 12 may be the same, reflecting a steady-state equilibrium in temperatures between the heat storage material 14 and the air 70. Activation of the heater element 54, however, may raise the temperature of the optical fiber assembly 56 in the region of the air 70 by more than the temperature is raised at the optical fiber assembly 56 in the region of liquid heat storage material 14 resulting from a greater thermal conductivity or thermal convection provided by the liquid heat storage material 14. A temperature difference (delta T) 82 measured at multiple points along the length of the optical fiber assembly 56 with and without activation of the heater element 54 may thus reveal fundamental properties of the surrounding materials. More sophisticated measurements may look at the rise time or decay time of temperature when the heater is activated and deactivated and for example fit these measurements to a curve indicating thermal conductivity.

Figure 4:
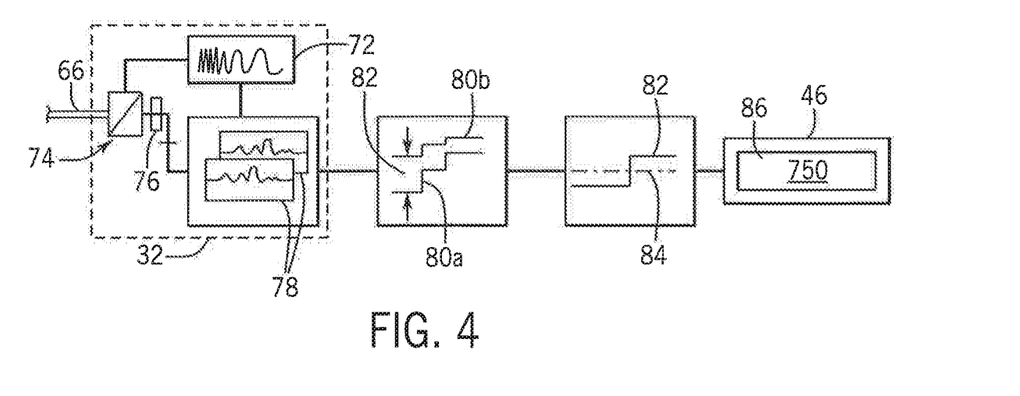
FIG. 4 is a signal flow diagram describing a program executed by the reflectometer of FIG. 1.

Referring now also to FIG. 4, the optical assembly 32 may provide for a frequency controllable laser 72 operated by the computer 34, for example, to sweep through light frequencies. This swept light is provided to beam splitter 74 coupling the light into the optical fiber 66.

Within the optical fiber 66, Rayleigh scattering in microscopic inclusions within the optical fiber 66 may cause reflections back through the optical fiber 66 through the beam splitter 74 to be received by photodetector 76. Using principles of optical reflectometry, the time domain reflection signals 78 can be converted to distance measurements (by an inverse Fourier transform) indicating a distance along the optical fiber 66 of the various inclusions. Knowing these distances allows determination of slight changes in the locations of the microscopic inclusions within the optical fiber (caused by expansion and contraction of the optical fiber 66 with temperature, for example, by cross correlation between frequency domain reflection signals.

The changes in the locations of the inclusions can be related to temperatures along the optical fiber 66 through knowledge of the expansion coefficient of the glass of the optical fiber 66 to produce temperature profiles 80a and 80b describing the temperature at multiple points along the optical fiber 66, with temperature profiles 80a and 80b indicating, for example, temperatures obtained while the heater element 54 is deactivated and activated, respectively.

At each location, the difference between signals 80a and 80b can be used to produce a measure of thermal resistivity 82 in the material adjacent to the probe 22 at that location with lower temperature differences indicating a higher thermal conductivity material. By applying a threshold 84 to this measure of thermal resistivity 82, a liquid height 86 may be displayed, for example, on display 46 indicating the location of the surface level 12.

Alternatively, it will be appreciated that the heater element 54 may remain activated and a single signal 80 may be acquired providing temperatures that reflect an underlying convection or thermal conductivity at the various points along the optical fiber 66.

Figure 7:
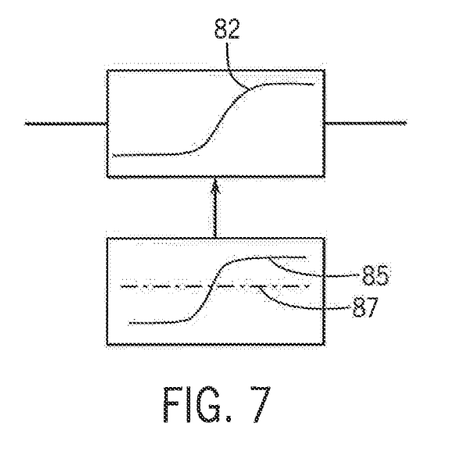
FIG. 7 is a fragmentary view of the signal flow diagram of FIG. 4 showing a curve-fitting process.

Referring now momentarily to FIG. 7, instead of using a fixed threshold as shown in FIG. 4, the measured thermal resistivity 82. (reflecting apparent thermal resistance, possibly caused by convection) may be fit to an empirically or theoretically established curve 85 indicating expected apparent thermal resistivity values on either side of a surface level 87 for known materials (for example air and sodium 14). By using a curve fitting process, the determined level 87 indicates the surface level 12 and may be based broadly on multiple points of the thermal resistivity 82 thus providing a more robust and noise resistant level measurement.

In order to provide high axial resolution, radial thermal conductivity through the probe 22 or convection from the probe should be promoted relative to axial conductivity such as can be provided by using a small diameter probe, for example, less than 10 millimeters in diameter and taking additional steps to reduce the thermal resistance radially compared to the thermal resistance axially for example by using a thin sheath 58 and minimizing separation between the resistive heating element 60 the outer sheath 50 and the optical fiber 66 and/or using non-isotropic conductive potting media 52, for example having insulating region space axially along the probe 22.

Figure 5:
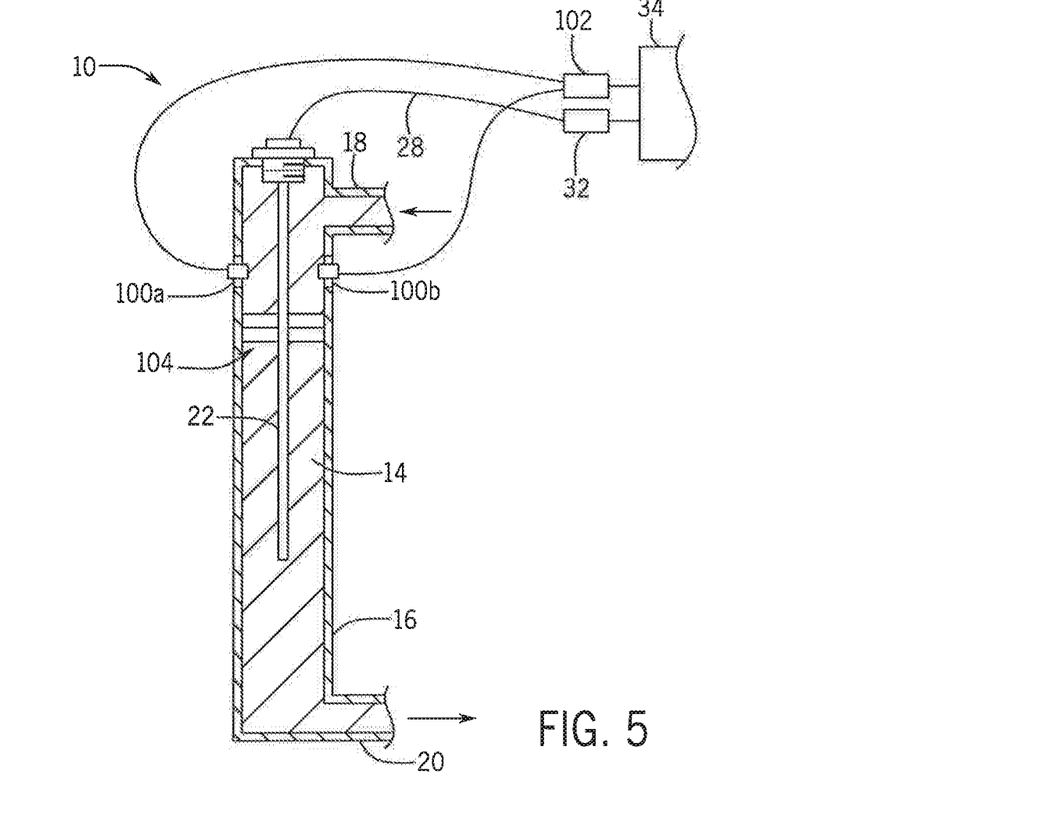
FIG. 5 is a fragmentary figure similar to FIG. 1 showing the use of the probe for flow velocity sensing.

Referring now to FIGS. 4 and 5, in an alternative embodiment, the probe 22 may be employed to measure a flow rate of liquid heat storage material 14 through the accumulator 16, for example, from the inlet 18 to the outlet 20. For this purpose, electrically isolated diametric electrodes 100a and 100b are inserted through the accumulator 16 at a known location along the axis of flow to contact the electrically conductive liquid heat storage material 14. The electrodes 100 may be connected to a power supply 102 controllable by the computer 34 to promote an intense current flow between the electrodes 100 through the liquid heat storage material 14 for a short period of time to create a heated zone 104. Flow of the liquid heat storage material 14 causes the heated zone 104 to progress along the length of the probe 22.

Alternatively, natural fluctuations in the variation in the temperature of the liquid heat storage material 14 may be measured without heating by the electrodes 100. These variations may be detected at multiple points along the probe 22 to generate a temperature profile that can be tracked by correlation with later measurements to deduce movement of the liquid heat storage material 14.

Figure 6:
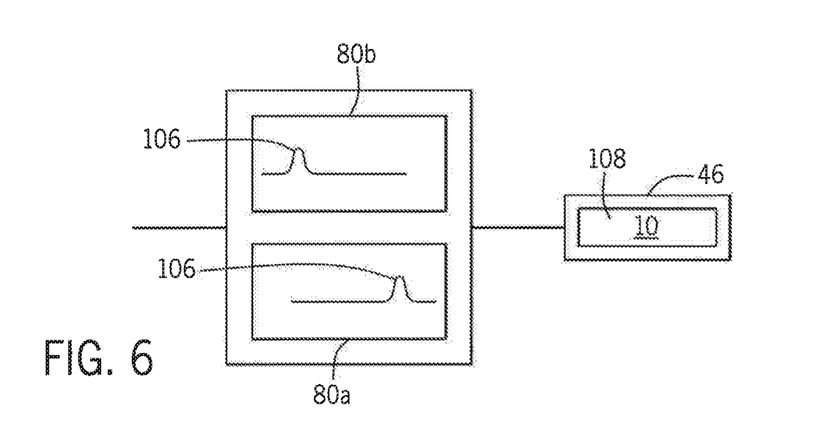
FIG. 6 is a fragmentary view similar to that of FIG. 4 showing comparison of temperatures at different times to deduce flow velocity.

Referring also to FIG. 6, in this case, successive pairs of temperature profiles 80a and 80b may be obtained not associated with activation and deactivation of the heater but simply at different times. These temperature profiles 80 can be analyzed to detect the passage of the heated zone 104 manifested as a pulsed temperature increase 106 in each of the profiles 80. By timing the passage of the temperature increase 106 between two different locations indicated by the profiles 80, a velocity signal 108 may be output, for example, on display 46.

Figure 8:
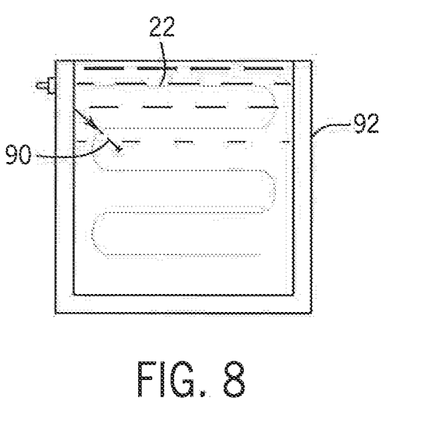
FIG. 8 is a figure showing curvature of the probe to provide multiple measurement points over an area and/or volume.

Referring now to FIG. 8, the use of an optical fiber 66 allows the probe 22 to navigate curves up to the limit of flexibility of the materials and ability of the optical fiber 66 to retain internal reflection. Typically, curvature radii 90 of as little as one inch in radius or less than five inches in radius may be tolerated with the presently described materials. As a result, the probe 22 may pass in a serpentine path, for example, through a tank 92 holding materials to be characterized.

Figure 10:
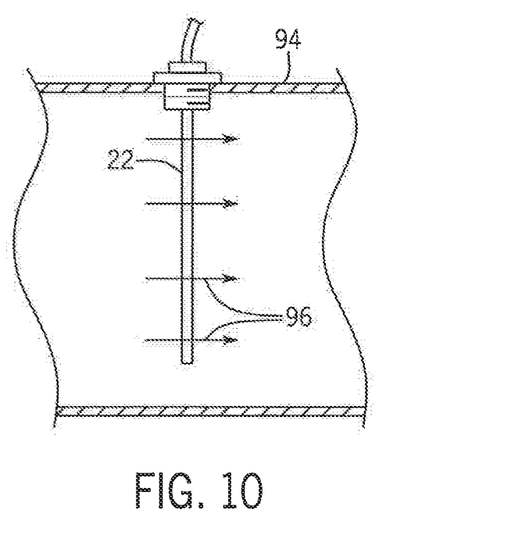
FIG. 10 is an alternative application of the probe for providing multipoint flow measurements.

Referring to FIG. 10, the probe 22 may be placed in a conduit 94 to extend generally perpendicular to a flow direction 96 of material within the conduit. The contained heater element of the probe 22 thus allows flow to be measured at multiple points along the length of the probe 22.

It will be appreciated that this invention is not limited to the use with liquid sodium and in some embodiments may be used with conventional materials in non-extreme temperatures, for example, for flow measurement or height measurement. In one embodiment, the system may be used to monitor degradation of solid fuel elements within a nuclear reactor by embedding the probe 22 in that material. It will further be appreciated that the probe 22 need not be straight but can accommodate gentle bends limited only by the light retention ability of the optical fiber 66 and the flexibility of the surrounding protective elements.

Certain terminology is used herein for purposes of reference only, and thus is not intended to be limiting. For example, terms such as "upper", "lower", "above", and "below" refer to directions in the drawings to which reference is made, Terms such as "front", "back", "rear", "bottom" and "side", describe the orientation of portions of the component within a consistent but arbitrary frame of reference which is made clear by reference to the text and the associated drawings describing the component under discussion, Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A sensor system comprising:
    a glass optical fiber;
    a heater strip coextending with the glass optical fiber;
    an optical assembly for transmitting light into the glass optical fiber and detecting light received from the glass optical fiber; and
    an electronic circuit communicating with the optical assembly and the heater strip to:
    (a) characterize temperature at multiple points along a length of the glass optical fiber from the light received from the glass optical fiber as influenced by heat output from the heater strip; and
    (b) determine and output a measure related to a thermal property of a medium surrounding the glass optical fiber and heater strip;
    wherein the electronic circuit characterizes locations of Rayleigh scatterers within the glass optical fiber and correlates them to known temperature locations to deduce temperature and determines temperature difference with activation of the heater strip to determine thermal properties;
    further including a gas tight thermally conductive shield around the glass optical fiber, the thermally conductive shield providing a fluid contacting and surrounding the glass optical fiber to allow relative slippage between the thermally conductive shield and the glass optical fiber, the thermally conductive shield, fluid and the glass optical fiber cooperating to prevent stress in the glass optical fiber caused by relative differences in thermal expansion from affecting the characterization of temperature, the fluid being non-reactive with the glass optical fiber.

2. The sensor system of claim 1 wherein the thermally conductive shield is a tube of a material selected from the group consisting of stainless steel and ceramic, and wherein the fluid is positioned between and inner wall of the tube and the glass optical fiber.

3. The sensor system of claim 2 wherein the fluid is a moisture-free noble gas.

4. The sensor system of claim 3 wherein the moisture-free noble gas is helium.

5. The sensor system of claim 2 wherein the fluid is a liquid metal.

6. The sensor system of claim 2 wherein the fluid is a fluid at room temperature.

7. The sensor system of claim 1 further including a sheath surrounding the glass optical fiber and the heater strip including a conductive potting material holding the heater strip and glass optical fiber in thermal proximity.

8. The sensor system of claim 1 wherein the heater strip is a resistive wire element providing substantially uniform distributed heating along the length of the heater strip.

9. The sensor system of claim 1 wherein the optical assembly is attached to a proximate end of the glass optical fiber, and a distal end of the glass optical fiber attaches to a lossy optic segment suppressing reflectance.

10. The sensor system of claim 1 wherein the glass optical fiber is a glass, single-mode fiber, free of organic cladding material.

11. The sensor system of claim 1 wherein the optical assembly provides a variable wavelength laser and a photo detector positioned at a distal end of the glass optical fiber to transmit light into the glass optical fiber through a beam splitter and receive light out of the glass optical fiber through the beam splitter.

12. The sensor system of claim 11 wherein the electronic circuit provides a Fourier transform reflectometer characterizing temperature by monitoring Rayleigh scattering from inclusions in the glass optical fiber as modified by a change in temperature of the glass optical fiber.

13. The sensor system of claim 11 wherein the electronic circuit determines a material interface by fitting a curve to the determined thermal properties, the curve providing example thermal properties expected for particular materials at a material interface.

14. The sensor system of claim 1 further including a tank holding a liquid heat storage material selected from the group consisting of a liquid metal and a liquid salt and wherein the glass optical fiber of the sensor system extends through a surface boundary of the liquid heat storage material and wherein the output of the electronic circuit provides a liquid level height of the liquid heat storage material.

15. The sensor system of claim 1 wherein the probe is flexible to allow operation with a curvature of the probe having a radius of curvature less than 5 inches.

16. The sensor system of claim 1 wherein the fluid has a thermal conductivity no less than that of helium.

17. The sensor system of claim 1 wherein the thermally conductive shield provides electrical contacts allowing passage of current through an electrically conductive material of the thermally conductive shield providing the heater strip.

* * * * *